United States Patent
Zhou

(10) Patent No.: US 11,341,013 B2
(45) Date of Patent: May 24, 2022

(54) ELECTRONIC DEVICE HAVING A DEBUGGING DEVICE

(71) Applicant: Fulian Precision Electronics (Tianjin) Co., LTD., Tianjin (CN)

(72) Inventor: Xiao-Long Zhou, Tianjin (CN)

(73) Assignee: Fulian Precision Electronics (Tianjin) Co., LTD., Tianjin (CN)

(*) Notice: Subject to any disclaimer, the term of this patent is extended or adjusted under 35 U.S.C. 154(b) by 226 days.

(21) Appl. No.: 16/665,298

(22) Filed: Oct. 28, 2019

(65) Prior Publication Data

US 2020/0379860 A1 Dec. 3, 2020

(30) Foreign Application Priority Data

May 30, 2019 (CN) .......................... 201910463729.5

(51) Int. Cl.
  *G06F 11/27* (2006.01)
  *G06F 11/273* (2006.01)
  *G06F 11/22* (2006.01)
  *G06F 11/36* (2006.01)

(52) U.S. Cl.
  CPC ............ *G06F 11/27* (2013.01); *G06F 11/221* (2013.01); *G06F 11/2236* (2013.01); *G06F 11/2733* (2013.01); *G06F 11/3656* (2013.01)

(58) Field of Classification Search
  CPC .... G06F 11/27; G06F 11/221; G06F 11/2236; G06F 11/2733; G06F 11/3656
  See application file for complete search history.

(56) References Cited

U.S. PATENT DOCUMENTS

| 6,678,838 B1* | 1/2004 | Magro | G06F 11/3656 710/310 |
| 2013/0151899 A1* | 6/2013 | Wang | G06F 11/221 714/27 |
| 2013/0268708 A1* | 10/2013 | Huang | G06F 11/2733 710/301 |
| 2016/0283351 A1* | 9/2016 | Huang | G06F 11/3656 |
| 2017/0269157 A1* | 9/2017 | Mao | G06F 13/4027 |
| 2018/0018127 A1* | 1/2018 | Thomas | G06F 11/2236 |
| 2018/0224504 A1* | 8/2018 | Kim | G06F 11/3466 |

(Continued)

FOREIGN PATENT DOCUMENTS

CN 106339344 A 1/2017

OTHER PUBLICATIONS

Nicolas Fournel et al., "Porting the Mutek Operating System to ARM Platforms", 2006, pp. 1-38 (Year: 2006).*

(Continued)

*Primary Examiner* — Matthew M Kim
*Assistant Examiner* — Indranil Chowdhury
(74) *Attorney, Agent, or Firm* — ScienBiziP, P.C.

(57) ABSTRACT

A debugging device includes a plurality of debug units, a UART port, and a processor. The debugging device is communicated with an electronic device through the UART port. The processor can receive debug signals from the terminal through the UART port, generate a plurality of debug controlling commands based on the debug signals, and send the plurality of debug controlling commands to the plurality of debug units, for controlling the plurality of debug units to debug the electronic device according to the plurality of debug controlling commands.

7 Claims, 2 Drawing Sheets

(56) References Cited

U.S. PATENT DOCUMENTS

2018/0373607 A1\* 12/2018 Kuehnis .................. G06F 11/24
2019/0138369 A1\* 5/2019 Lambert .................. G06F 11/07
2021/0123973 A1\* 4/2021 Zhu ....................... G06F 1/3203

OTHER PUBLICATIONS

David Backstrom, "Boundary-Scan in the ATCA Standard", 2005, Final Thesis, Linkoping Institute of Technology, pp. 1-59 (Year: 2005).\*

\* cited by examiner

ELECTRONIC DEVICE HAVING A DEBUGGING DEVICE

CROSS-REFERENCE TO RELATED APPLICATIONS

This application claims priority to Chinese Patent Application No. 201910463729.5 filed on May 30, 2019, the contents of which are incorporated by reference herein.

FIELD

The subject matter herein generally relates to debugging field, specifically, a debugging device and an electronic device having the debugging device.

BACKGROUND

Electronic devices, such as a server, usually needs to design multiple debugging switches or jumpers for the PCH, BMC, CPLD and other chips to debug the server. However, these debug switches or jumpers may occupy space of the server, and may be used for debugging of fixed functions.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
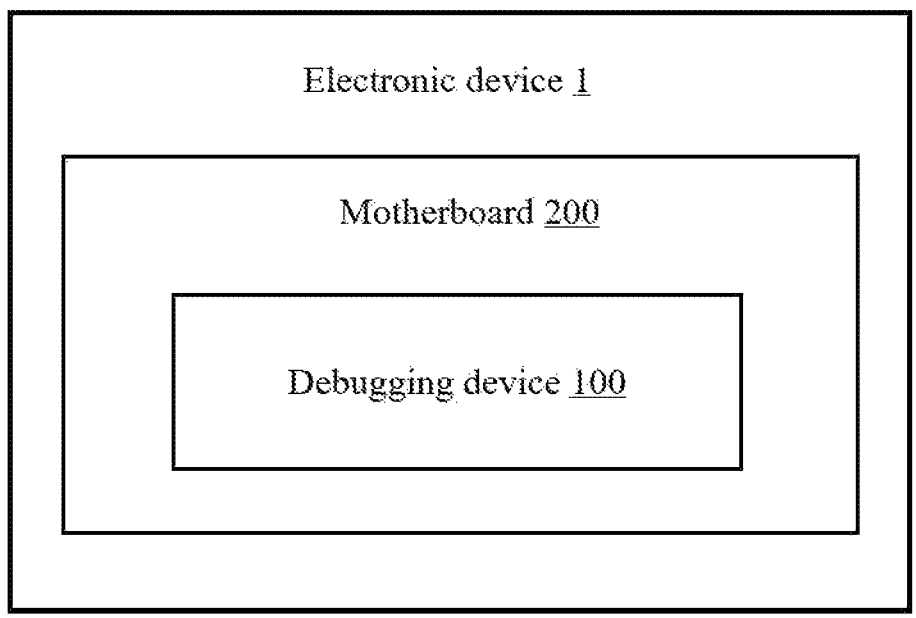
FIG. 1 is a block diagram of one embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiment, and such references mean "at least one."

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY™, flash memory, and hard disk drives. The term "comprises" means "including, but not necessarily limited to"; it specifically indicates open-ended inclusion or membership in a so-described combination, group, series, and the like.

FIG. 1 shows a block diagram of one embodiment of an electronic device. Depending on the embodiment, the electronic device 1 can include, but is not limited to, a debugging device 100, and a motherboard 200. The debugging device 100 may be located on the motherboard 200.

In at least one exemplary embodiment, the electronic device 1 can be, but is not limited to, a server, a personal computer, or any other suitable electronic device. FIG. 1 illustrates only one example of the electronic device 1, other examples can comprise more or fewer components than those shown in the embodiment, or have a different configuration of the various components. For example, the electronic device 1 can further include a circuit system, input/output interface, a battery, an operating system, and so on.

Figure 2:
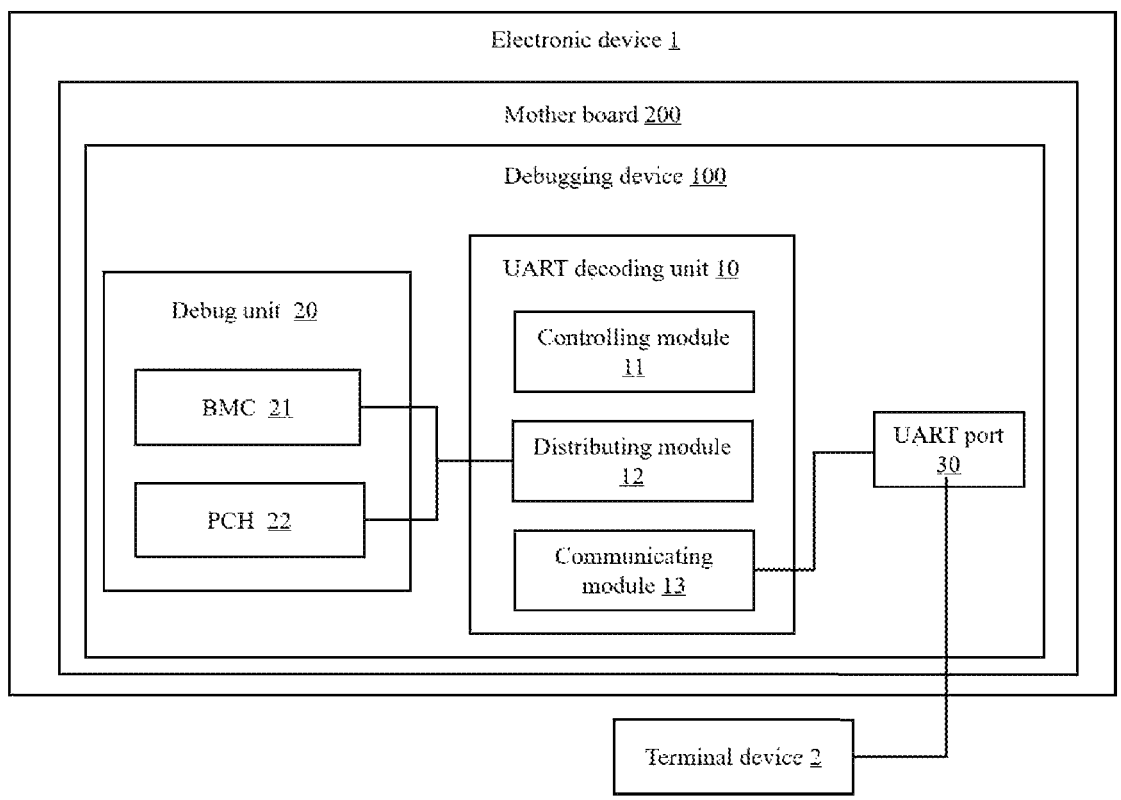
FIG. 2 is a block diagram of one embodiment of a debugging device of the electronic device of FIG. 1.

FIG. 2 shows a block diagram of one embodiment of a debugging device. Depending on the embodiment, the debugging device 100 can include, but is not limited to, a UART decoding unit 10, several debug units 20, and a Universal Asynchronous Receiver/Transmitter (UART) port 30. The debugging device 100 may be located on the motherboard 200.

In at least one exemplary embodiment, the debugging device 100 is communicating with a terminal device 2 through the UART port 30. The terminal device 2 can be a personal computer. If the electronic device 1 needs to be debugged, a user can send debug signals to the electronic device 1 through the terminal device 2.

In at least one exemplary embodiment, the UART decoding unit 10 can receive the debug signals from the terminal device 2 through the UART port 30. The UART decoding unit 10 can send several debug controlling commands to the several debug units 20 based on the debug signals, to control the several debug units 20 to debug the electronic device 1 according to the debug signals.

In at least one exemplary embodiment, the UART decoding unit 10 as shown in FIG. 1 can include, but is not limited to, a controlling module 11, a distributing module 12, and a communicating module 13. The modules 11-13 can comprise computerized instructions in the form of one or more computer-readable programs that can be stored in a non-transitory computer-readable medium, and executed by the UART decoding unit 10 of the electronic device 1. The controlling module 11 can generate debug controlling commands based on the debug signals. The distributing module 12 can send the debug controlling commands to corresponding debug unit 20 according to a debug function of the debug unit 20. The communicating module 12 can establish a communication connecting between the debug device 100 and the electronic device 1 by electrically connecting to the UART port 30.

In at least one exemplary embodiment, the several debug units 20 can include, but is not limited, a Baseboard Management Controller (BMC) 21, and a Platform Controller Hub (PCH) 22.

In at least one exemplary embodiment, the BMC 21 can debug a system state of the electronic device 1 based on the debug signals. The system state can include a power state, an open state, and a hardware state. The PCH 22 is configured to debug hardware function of the electronic device 1 according to the debug signals. In one exemplary embodiment, the hardware includes a hard disk, a memory, a graphics card, and the like.

In at least one exemplary embodiment, the UART port 30 can include four pins. The four pins can include a power pin, a ground pin, a receive data pin, and a transmit data pin.

In at least one exemplary embodiment, the UART decoding unit 10 can be a Complex Programmable Logic Device (CPLD) chip, or a Field Programmable Gate Array (FPGA) chip.

In at least one exemplary embodiment, the UART decoding unit 10 can pre-store several debug controlling commands. The debug controlling commands are generated according to a preset debug function, and the debug control commands may also be adjusted according to a user-adjusted debug function.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. An electronic device comprising:
a motherboard;
a debugging device located on the motherboard;
wherein the debugging device comprising;
a plurality of debug units;
a Universal Asynchronous Receiver/Transmitter (UART) port, wherein the debugging device communicates with a terminal device through the UART port; and
a UART decoding unit receiving debug signals from the terminal device through the UART port, wherein the UART decoding unit generates a plurality of debug controlling commands based on the debug signals, and sends the plurality of debug controlling commands to the plurality of debug units thereby controlling the plurality of debug units to debug the electronic device according to the plurality of debug controlling commands, the plurality of debug units comprising a Baseboard Management Controller (BMC), the BMC debugging system states of the electronic device according to the debug signals, the system states comprising a power state, an open state, and a hardware state.

2. The electronic device according to claim 1, wherein the UART decoding unit comprising a controlling module, a distributing module, and a communicating module, the controlling module generates the plurality of debug controlling commands based on the debug signals, the distributing module sends the plurality of debug controlling commands to the plurality of debug units respectively according to a debug function of each of the debug units, the communicating module is electrically connected to the UART port.

3. The electronic device according to claim 1, wherein the plurality of debug units further comprising a Platform Controller Hub (PCH).

4. The electronic device according to claim 3, wherein the PCH debugs hardware function of the electronic device according to the debug signals.

5. The electronic device according to claim 1, wherein the UART port comprising a power pin, a ground pin, a receive data pin, and a transmit data pin.

6. The electronic device according to claim 1, wherein the UART decoding unit is a Complex Programmable Logic Device (CPLD) chip, or a Field Programmable Gate Array (FPGA) chip.

7. The electronic device according to claim 1, wherein the UART decoding unit pre-stores debug controlling commands and the debug controlling commands are generated according to a preset debug function.

* * * * *